(12) United States Patent
Teslenko et al.

(10) Patent No.: US 11,495,232 B2
(45) Date of Patent: Nov. 8, 2022

(54) HANDLING OF POOR AUDIO QUALITY IN A TERMINAL DEVICE

(71) Applicant: Telefonaktiebolaget LM Ericsson (publ), Stockholm (SE)

(72) Inventors: Maxim Teslenko, Sollentuna (SE); Elena Fersman, Stockholm (SE); Volodya Grancharov, Solna (SE); Athanasios Karapantelakis, Solna (SE); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 16/500,449

(22) PCT Filed: Apr. 20, 2017

(86) PCT No.: PCT/EP2017/059388
§ 371 (c)(1),
(2) Date: Oct. 3, 2019

(87) PCT Pub. No.: WO2018/192659
PCT Pub. Date: Oct. 25, 2018

(65) Prior Publication Data
US 2020/0193999 A1    Jun. 18, 2020

(51) Int. Cl.
*G10L 15/26* (2006.01)
*G06F 3/16* (2006.01)
(Continued)

(52) U.S. Cl.
CPC ............... *G10L 15/26* (2013.01); *G06F 3/16* (2013.01); *G10L 13/02* (2013.01); *G10L 13/04* (2013.01);
(Continued)

(58) Field of Classification Search
CPC . H04M 2201/40; H04M 3/2236; G10L 15/22; G10L 15/30; G10L 13/04; G10L 15/26; H04L 43/08
See application file for complete search history.

(56) References Cited

U.S. PATENT DOCUMENTS

| | | |
|---|---|---|
| 2005/0049868 A1 | 3/2005 | Busayapongchai |
| 2006/0155850 A1* | 7/2006 | Ma .................... H04L 29/06 709/226 |

(Continued)

FOREIGN PATENT DOCUMENTS

| | | | |
|---|---|---|---|
| CN | 102447774 A | * 5/2012 | ........ H04M 3/42391 |
| EP | 2663064 A2 | 11/2013 | |

(Continued)

OTHER PUBLICATIONS

International Search Report and Written Opinion of the International Searching Authority, PCT/EP2017/059388, dated Jan. 3, 2018, 13 pages.

*Primary Examiner* — Samuel G Neway
(74) *Attorney, Agent, or Firm* — Sage Patent Group (57) ABSTRACT

There is provided mechanisms for handling poor audio quality. A method is performed by a receiving terminal device. The method comprises obtaining an indication of poor audio quality of incoming audio at the receiving terminal device. The incoming audio originates from a transmitting terminal device. The method comprises initiating text conversion of the incoming audio. The method comprises receiving text resulting from automatic speech recognition having been applied to the incoming audio. The method comprises providing a representation of the text to a user interface of the receiving terminal device.

20 Claims, 4 Drawing Sheets

(51) Int. Cl.
  *G10L 13/02* (2013.01)
  *G10L 25/60* (2013.01)
  *H04L 65/80* (2022.01)
  *H04L 65/75* (2022.01)
  *H04L 43/08* (2022.01)
  *G10L 13/04* (2013.01)
  *G10L 15/30* (2013.01)
  *G10L 15/22* (2006.01)
  *H04M 3/22* (2006.01)

(52) U.S. Cl.
  CPC .............. *G10L 15/22* (2013.01); *G10L 15/30* (2013.01); *G10L 25/60* (2013.01); *H04L 43/08* (2013.01); *H04L 65/75* (2022.05); *H04L 65/80* (2013.01); *H04M 3/2236* (2013.01); *H04M 2201/40* (2013.01)

(56) References Cited

U.S. PATENT DOCUMENTS

| | | | |
|---|---|---|---|
| 2009/0125299 A1* | 5/2009 | Wang | G10L 15/22 |
| | | | 704/201 |
| 2011/0231184 A1* | 9/2011 | Kerr | G10L 15/26 |
| | | | 704/201 |
| 2013/0173264 A1* | 7/2013 | Kiss | G10L 25/63 |
| | | | 704/231 |
| 2018/0218727 A1* | 8/2018 | Cutler | H04M 7/006 |
| 2020/0193999 A1* | 6/2020 | Teslenko | G10L 15/26 |

FOREIGN PATENT DOCUMENTS

| | | | | |
|---|---|---|---|---|
| EP | 3039803 A1 | 7/2016 | | |
| EP | 3039803 B1 * | 7/2017 | ............. | H04L 43/16 |
| WO | WO 2017/194134 A1 | 11/2017 | | |

\* cited by examiner

HANDLING OF POOR AUDIO QUALITY IN A TERMINAL DEVICE

This application is a 35 U.S.C. § 371 national stage application of PCT International Application No. PCT/EP2017/059388 filed on Apr. 20, 2017, the disclosure and content of which is incorporated by reference herein in its entirety.

TECHNICAL FIELD

Embodiments presented herein relate to methods, a terminal device, a network node, computer programs, and a computer program product for handling poor audio quality.

BACKGROUND

In communications systems, there may be a challenge to obtain good performance and capacity for a given communications protocol, its parameters and the physical environment in which the communications system is deployed.

For example, one parameter in providing good performance and capacity for a given communications protocol in a communications system is the ability to handle poor audio quality.

There could be multiple reasons that cause the poor audio quality; background noise on either the sender side or the receiver, poor channel quality causing corrupted or dropped packets, hardware failure, etc.

Filtering techniques could be used in order to handle background noise. One common technique is to filter out frequencies in the audio which lay outside the human speech diapason. One drawback of this approach is that any desired communication of audio outside the human speech diapason is imposable. Another drawback of this approach is that all the background noise within the human speech diapason remains in the audio.

Poor channel quality could be addressed by reducing the audio quality bitrate and/or by using more robust error correcting codes. Such approaches work well for moderate channel quality degradation but generally cannot cope well with severe channel disruptions.

Hardware failures are rarely addressed in consumer communication devices. For mission critical applications such as in aerospace, military, security, etc. different redundancy technics are used which duplicate critical components or the whole system. One drawback of this approach is the increased cost and size.

Hence, there is still a need for an improved handling of poor audio quality.

SUMMARY

An object of embodiments herein is to provide efficient handling of poor audio quality.

According to a first aspect there is presented a method for handling poor audio quality. The method is performed by a receiving terminal device. The method comprises obtaining an indication of poor audio quality of incoming audio at the receiving terminal device. The incoming audio originates from a transmitting terminal device. The method comprises initiating text conversion of the incoming audio. The method comprises receiving text resulting from automatic speech recognition having been applied to the incoming audio. The method comprises providing a representation of the text to a user interface of the receiving terminal device.

According to a second aspect there is presented a terminal device for handling poor audio quality. The terminal device comprises processing circuitry. The processing circuitry is configured to cause the terminal device to obtain an indication of poor audio quality of incoming audio at the receiving terminal device. The incoming audio originates from a transmitting terminal device. The processing circuitry is configured to cause the terminal device to initiate text conversion of the incoming audio. The processing circuitry is configured to cause the terminal device to receive text resulting from automatic speech recognition having been applied to the incoming audio. The processing circuitry is configured to cause the terminal device to provide a representation of the text to a user interface of the receiving terminal device.

According to a third aspect there is presented a terminal device for handling poor audio quality. The terminal device comprises processing circuitry and a storage medium. The storage medium stores instructions that, when executed by the processing circuitry, cause the terminal device to perform operations, or steps. The operations, or steps, cause the terminal device to obtain an indication of poor audio quality of incoming audio at the receiving terminal device. The incoming audio originates from a transmitting terminal device. The operations, or steps, cause the terminal device to initiate text conversion of the incoming audio. The operations, or steps, cause the terminal device to receive text resulting from automatic speech recognition having been applied to the incoming audio. The operations, or steps, cause the terminal device to provide a representation of the text to a user interface of the receiving terminal device.

According to a fourth aspect there is presented a terminal device for handling poor audio quality. The terminal device comprises an obtain module configured to obtain an indication of poor audio quality of incoming audio at the receiving terminal device. The incoming audio originates from a transmitting terminal device. The terminal device comprises an initiate module configured to initiate text conversion of the incoming audio. The terminal device comprises a receive module configured to receive text resulting from automatic speech recognition having been applied to the incoming audio. The terminal device comprises a provide module configured to provide a representation of the text to a user interface of the receiving terminal device.

According to a fifth aspect there is presented a computer program for handling poor audio quality. The computer program comprises computer program code which, when run on processing circuitry of a terminal device, causes the terminal device to perform a method according to the first aspect.

According to a sixth aspect there is presented a method for handling poor audio quality. The method is performed by a network node. The method comprises obtaining an indication of poor audio quality of audio to be delivered to a receiving terminal device. The audio originates from a transmitting terminal device. The method comprises initiating text conversion of the incoming audio. The method comprises providing text resulting from automatic speech recognition having been applied to the audio to the receiving terminal device.

According to a seventh aspect there is presented a network node for handling poor audio quality. The network node comprises processing circuitry. The processing circuitry is configured to cause the network node to obtain an indication of poor audio quality of audio to be delivered to a receiving terminal device. The audio originates from a transmitting terminal device. The processing circuitry is configured to cause the network node to initiate text conversion of the incoming audio. The processing circuitry is configured to cause the network node to provide text resulting from automatic speech recognition having been applied to the audio to the receiving terminal device.

According to an eighth aspect there is presented a network node for handling poor audio quality. The network node comprises processing circuitry and a storage medium. The storage medium stores instructions that, when executed by the processing circuitry, cause the network node to perform operations, or steps. The operations, or steps, cause the network node to obtain an indication of poor audio quality of audio to be delivered to a receiving terminal device. The audio originates from a transmitting terminal device. The operations, or steps, cause the network node to initiate text conversion of the incoming audio. The operations, or steps, cause the network node to provide text resulting from automatic speech recognition having been applied to the audio to the receiving terminal device.

According to a ninth aspect there is presented a network node for handling poor audio quality. The network node comprises an obtain module configured to obtain an indication of poor audio quality of audio to be delivered to a receiving terminal device. The audio originates from a transmitting terminal device. The network node comprises an initiate module configured to initiate text conversion of the incoming audio. The network node comprises a provide module configured to provide text resulting from automatic speech recognition having been applied to the audio to the receiving terminal device.

According to a tenth aspect there is presented a computer program for handling poor audio quality, the computer program comprising computer program code which, when run on processing circuitry of a network node, causes the network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these terminal devices, these network nodes, and these computer programs provide efficient handling of poor audio quality.

Advantageously these methods, these terminal devices, these network nodes, and these computer programs make background noise at the receiving terminal device become irrelevant since the audio information could be provided in a text based format.

Advantageously these methods, these terminal devices, these network nodes, and these computer programs could be applied in scenarios of extremely poor channel quality. To transfer a stream of text only a few bytes per seconds is needed. With such low bitrate no audio communication is possible.

Advantageously these methods, these terminal devices, these network nodes, and these computer programs could be applied in scenarios of audio system issues at the receiving terminal device. If speakers or headphones fail then the user of the receiving terminal device would still be able to communicate by receiving text instead of audio.

It is to be noted that any feature of the first, second, third, fourth, fifth, sixth seventh, eight, ninth, tenth and eleventh aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
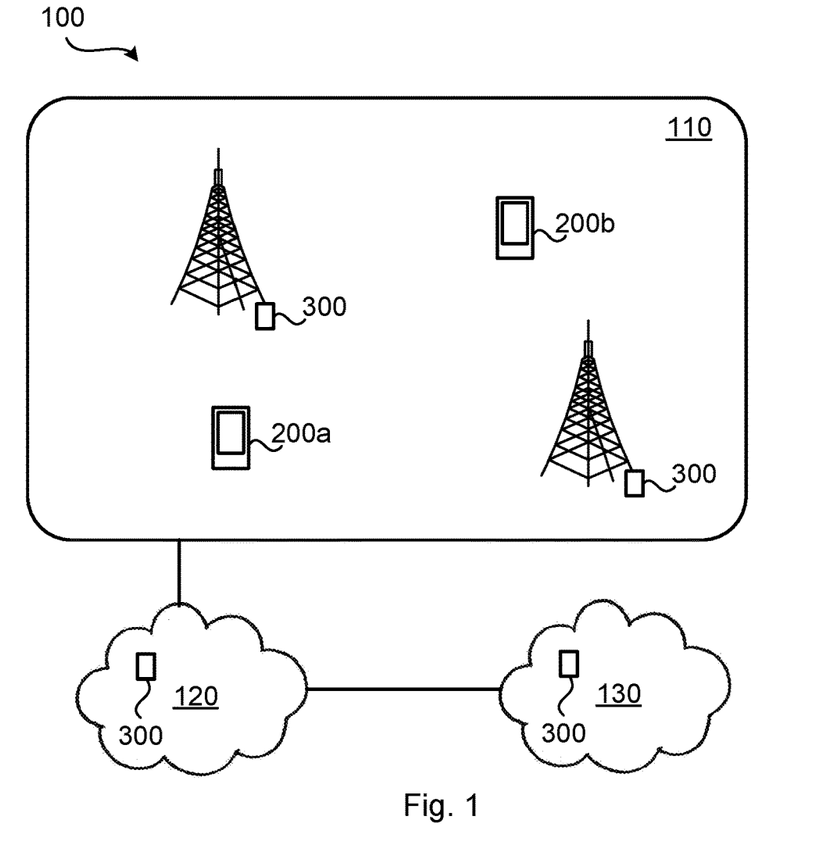
FIG. 1 is a schematic diagram illustrating a communications system according to embodiments.

FIG. 1 is a schematic diagram illustrating a communications system 100 where embodiments presented herein can be applied. The communications system 100 could be a third generation (3G) telecommunications system, a fourth generation (4G) telecommunications system, or a fifth (5G) telecommunications system and support any 3GPP telecommunications standard.

The communications system 100 comprises at least one network node 300 configured to provide network access to terminal devices 200a, 200b in a radio access network 110. The network node 300 provides network access in the radio access network 110 by transmitting signals to, and receiving signals from, the terminal devices 200a, 200b.

The radio access network 110 is operatively connected to a core network 120. The core network 120 is in turn operatively connected to a service network 130, such as the Internet. The terminal devices 200a, 200b are thereby, via the network node 300, enabled to access services of, and exchange data with, the service network 130 as well as exchanging data between the terminal devices 200a, 200b.

Examples of network nodes 300 include, but are not limited to, radio base stations, base transceiver stations, Node Bs, evolved Node Bs, gigabit Node Bs, access points, and access nodes. Examples of terminal devices 200a, 200b include, but are not limited to, mobile stations, mobile phones, handsets, wireless local loop phones, user equipment (UE), smartphones, laptop computers, tablet computers, and network equipped vehicles.

As the skilled person understands, the communications system 100 may comprise a plurality of network nodes 300, each providing network access to a plurality of terminal devices 200a, 200b. The herein disclosed embodiments are not limited to any particular number of network nodes 300 or wireless devices 200a, 200b. Further, although the terminal devices 200a, 200b in FIG. 1 are illustrated as having wireless access to the network node 300, the terminal devices 200a, 200b could either have a wired or wireless network access.

Terminal device 200a will below exemplify a receiving terminal device (i.e., a terminal device intended to receive audio) and terminal device 200b will below exemplify a transmitting terminal device (i.e., a terminal device intended to transmit audio). However, as the skilled person understands, terminal devices 200a and 200b could be configured to both transmit and receive audio and hence interchangeably act as either a receiving terminal device and transmitting terminal device.

One example of data that may be exchanged between the terminal devices 200a, 200b (either via one or more network nodes 300 or on a direct link between the terminal devices 200a, 200b) is audio. The audio could be part of a real-time multimedia stream (such as during a video call between the terminal devices 200a, 200b) or of a pure real-time audio stream (such as during a voice call between the terminal devices 200a, 200b).

As noted above, one parameter in providing good performance and capacity for a given communications protocol in a communications system is the ability to handle poor audio quality. There could be multiple reasons that cause the poor audio quality; background noise on either the sender side or the receiver, poor channel quality causing corrupted or dropped packets, hardware failure, etc. Issues with existing mechanisms for handling poor audio quality have been mentioned above.

It is therefore an object of the embodiments disclosed herein to provide efficient handling of poor audio quality.

The embodiments disclosed herein thus relate to mechanisms for handling poor audio quality. In order to obtain such mechanisms there is provided a terminal device 200a, a method performed by the terminal device 200a, a computer program product comprising code, for example in the form of a computer program, that when run on processing circuitry of the terminal device 200a, causes the terminal device 200a to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

Figure 2:
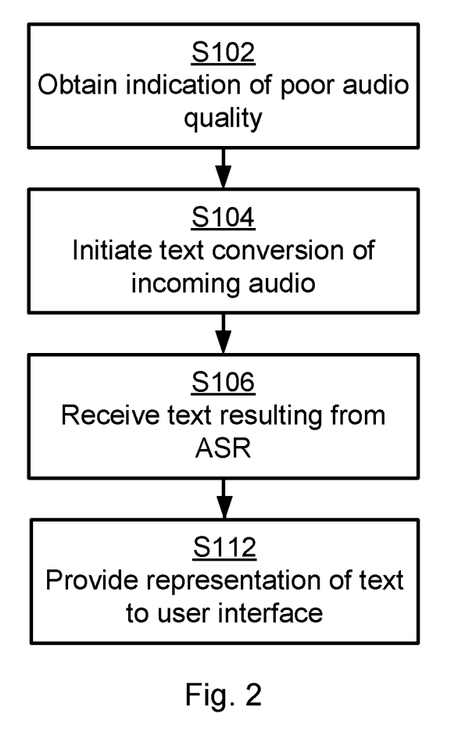
FIGS. 2, 3, and 4 are flowcharts of methods according to embodiments.
Figure 3:
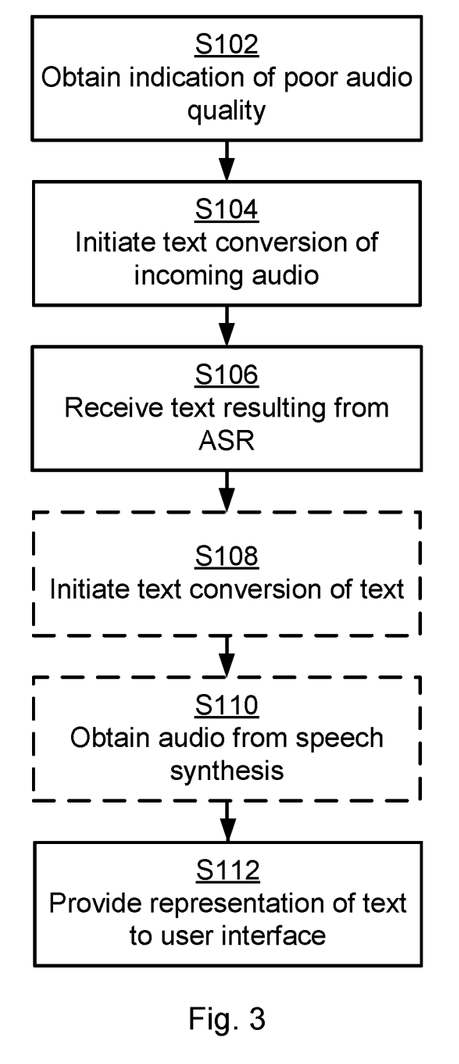
Figure 4:
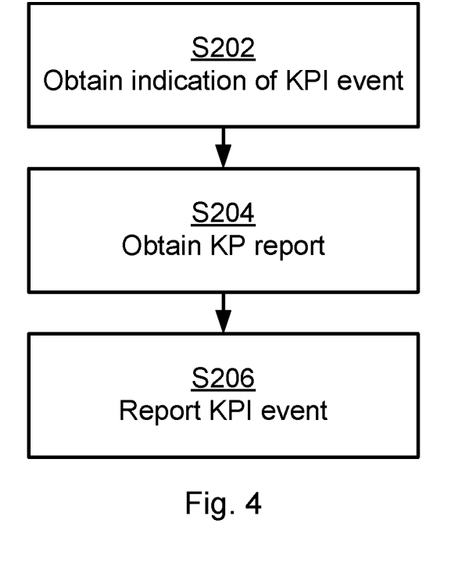

FIGS. 2 and 3 are flowcharts illustrating embodiments of methods for handling poor audio quality as performed by the terminal device 200a. FIG. 4 is a flowchart illustrating an embodiment of a method for handling poor audio quality as performed by the network node 300. The methods are advantageously provided as computer programs 1020a, 1020b.

Reference is now made to FIG. 2 illustrating a method for handling poor audio quality as performed by the terminal device 200a according to an embodiment.

The terminal device 200a is assumed to be configured to receive audio, such as speech, music, or other types of audio, from the transmitting terminal device 200b. Hence, the terminal device 200a is configured to perform step S102:

S102: The terminal device 200a obtains an indication of poor audio quality of incoming audio at the terminal device 200a. The incoming audio originates from the transmitting terminal device 200b. Examples of indications of poor audio quality will be disclosed below.

The indication of poor audio quality acts a trigger for the incoming audio to be converted into text. Particularly, the terminal device 200a is configured to perform step S104:

S104: The terminal device 200a initiates text conversion of the incoming audio. Examples of where the actual text conversion will be performed will be given below.

It is assumed that the audio is converted to text and thus that the terminal device 200a receives the text. Hence, the terminal device 200a is configured to perform step S106:

S106: The terminal device 200a receives text resulting from automatic speech recognition having been applied to the incoming audio.

A representation of the text is presented once the text has been received the terminal device 200a. Particularly, the terminal device 200a is configured to perform step S112:

S112: The terminal device 200a provides a representation of the text to a user interface of the receiving terminal device 200a. Different examples of representations of the text and user interfaces will be disclosed below.

Embodiments relating to further details of handling poor audio quality as performed by the terminal device 200a will now be disclosed.

There may be different entities in which the actual text conversion is performed. According to embodiments the automatic speech recognition of the audio is performed outside the receiving terminal device 200a. According to one example the automatic speech recognition is performed in the network node 300. According to another example the automatic speech recognition is performed in the transmitting terminal device 200b. The automatic speech recognition could be performed in the network node 300 when the poor audio quality is caused by a factor negatively impacting the transmission between the network node 300 and the terminal device 200a. The automatic speech recognition could be performed in the transmitting terminal device 200b when the poor audio quality is caused by a factor negatively impacting the transmission between the transmitting terminal device 200b and the network node 300.

The automatic speech recognition could be prone to misinterpret spoken words into text. In some aspects the text generated by the automatic speech recognition is therefore sent to the terminal device 200a along with information regarding the confidence of the text conversion. That is, according to an embodiment the text is received together with a confidence level indication. The confidence level indication represents an estimated accuracy of the automatic speech recognition of the incoming audio. Confidence of word recognition by the automatic speech recognition could be represented via color codes where each confidence level has its own color, or the words can be represented using smaller/larger fonts depending on the confidence level, or other combinations thereof.

A tolerance threshold could be used in order to avoid transmission of text to the terminal device 200a in scenarios where the text has too low confidence level. The tolerance threshold could be defined by a probability that states how accurately the automatic speech recognition has converted a segment of speech to text. That is, according to an embodiment each word in the text has its own confidence level indication, and any words of which the confidence level indication is below a threshold value are omitted from being included in the received text (i.e., the text as received by the terminal device 200a). The tolerance threshold could thus be used to avoid transmitting captured words that have a high probability of having been misrecognized during the automatic speech recognition.

There may be different types of indications of poor audio quality. Different embodiments relating thereto will now be described in turn.

In some aspects the indication is obtained via a microphone at the terminal device 200a. Particularly, according to an embodiment the indication of poor audio quality is represented by ambient noise picked up by a microphone at the terminal device 200a.

In some aspects the indication is obtained as a result of hardware or software failure (e.g. a speaker or headphone problem) at the terminal device 200a. Particularly, according to an embodiment the indication of poor audio quality is represented by a failure of an audio component at the terminal device 200a. Examples of audio components include, but are not limited to, electrical and/or mechanical components of speakers or headphones (or the headphone jack) at the terminal device 200a.

In some aspects the indication reflects a network parameter. That is, according to an embodiment the indication of poor audio quality is represented by a network parameter. Examples of network parameters that could be used to represent the indication of poor audio quality include, but are not limited to, dropped packet rate, inter arrival jitter, cumulative number of packet lost from beginning of session, timestamps indicate delay (by being too old), poor transmit and/or receive quality at the terminal device 200a, or an explicit indication from the network node 300, etc. There could be different ways to determine whether the network parameter indicates poor audio quality or not. For example, the dropped packet rate could be estimated as the fraction between the number of data packets assumed lost since the previous receiver report packet was sent and the number of packets expected to receive, where a value close to one this indicate poor audio quality. The inter arrival jitter could be estimated as the statistical variance of the data packet inter arrival time, where a data packet inter arrival time being higher than a threshold indicates poor audio quality. The last received timestamp of a sender report and the delay since the last sender report can be used to estimate the total round-trip-time, where a total round-trip-time higher than a threshold indicates poor audio quality.

Further, any threshold used in order to determine whether the network parameter indicates poor audio quality or not could depend on the type of call being made (if the audio is part of a call) or the type of media stream that the audio is part of (if the audio is part of a media stream). That is, according to an embodiment the incoming audio is part of a call, and the network parameter is associated with a threshold level, and the threshold level is set according to which type of call is made. For example, if the call is a mission-critical (MC) call, e.g. in case of an accident, then the accepted round-trip-time, jitter, and packet lost values could be lower than for example a non-MC call.

In some aspects the indication reflects user input. Particularly, according to an embodiment the indication of poor audio quality is obtained from user input at the receiving terminal device 200a. The user input could, for example, be obtained through a tactile user interface. This allows a user of the terminal device 200a to switch from audio to text in a quite environment when needing to turning audio off completely and thus receive only textual transcripts.

There may be different ways for the terminal device 200a to initiate the text conversion in step S104. As an example, the Session Initiation Protocol (SIP) could be used for session control (such as session setup, session renegotiation, session teardown, etc.) and the Real-time Transport Protocol (RTP) and RTP Control Protocol could be used for user-plane data transmission and network link quality control, respectively. During session setup using SIP, the session description protocol (SDP) is used as payload in SIP messages to describe the type of session. Therefore, according to an embodiment, initiating text conversion involves renegotiating a SIP session with SDP payload represented by the text. Thereby, when determining to initiate the text conversion, the SIP session is renegotiated whereby the terminal device 200a sends a SIP Invite message with the SDP payload being text.

Reference is now made to FIG. 3 illustrating methods for handling poor audio quality as performed by the terminal device 200a according to further embodiments. It is assumed that steps S102. S104, S106, S112 are performed as described above with reference to FIG. 2 and a thus repeated description thereof is therefore omitted.

There may be different types of representations of the text to be provided to the user interface of the receiving terminal device 200a.

According to an embodiment the user interface is a visual user interface, such as a display, and the representation of the text is the text itself. The text could then be displayed synchronously with the ordinary received audio. That is, according to an embodiment the text is provided to the visual user interface synchronized with the incoming audio being provided to an audio user interface, such as a speaker or a headphone jack, of the receiving terminal device 200a.

According to another embodiment the user interface is an audio user interface. In particular, in some aspects the text is synthesized back to audio and provided to the audio user interface. Hence, according to an embodiment the terminal device 200a is configured to perform steps S108 and S110:

S108: The terminal device 200a initiates speech conversion of the received text. The speech conversion could be performed by the terminal device 200a itself. Since the audio is still received as text to the terminal device 200a this could enable the data rate to be lowered whilst still allowing the user to listen to speech (although generated from the received text). Alternatively the speech conversion is performed by another entity, device, or node.

S110: The terminal device 200a obtains audio resulting from speech synthesis of the text. The speech synthesis is performed upon initiation of the speech conversion. The representation of the text is then defined by the audio resulting from the speech synthesis, and the user interface is an audio user interface.

Reference is now made to FIG. 4 illustrating a method for handling poor audio quality as performed by the network node 300 according to an embodiment.

In this embodiment the indication of poor audio quality is obtained at the network node 300. Hence, the network node 300 is configured to perform step S202:

S202: The network node 300 obtains an indication of poor audio quality of audio to be delivered to the receiving terminal device 200a. The audio originates from the transmitting terminal device 200b.

The indication of poor audio quality acts as a trigger for the audio to be converted into text. Particularly, the network node 300 is configured to perform step S204:

S204: The network node 300 initiates text conversion of the incoming audio. Examples of where the actual text conversion will be performed will be given below.

The text is then provided to the receiving terminal device 200a. Particularly, the network node 300 is configured to perform step S206:

S206: The network node 300 provides text resulting from automatic speech recognition having been applied to the audio to the receiving terminal device 200a.

Embodiments relating to further details of handling poor audio quality as performed by the network node 300 will now be disclosed.

There may be different examples of where the actual text conversion is performed. According to an embodiment the automatic speech recognition of the audio is performed by the network node 300. Alternatively, the automatic speech recognition of the audio is performed outside the network node 300, such as by another network node or by the transmitting terminal device 200b.

As above, the indication of poor audio quality could be represented by a network parameter. Examples of network parameters that could be used as indications of poor audio quality have been provided above and equally apply here. Thus the network parameters could represent dropped packet rate, inter arrival jitter, cumulative number of packet lost from beginning of session, timestamps indicate delay (by being too old), poor transmit and/or receive quality at the terminal device 200a, or an explicit indication from the network node 300, etc.

Figure 5:
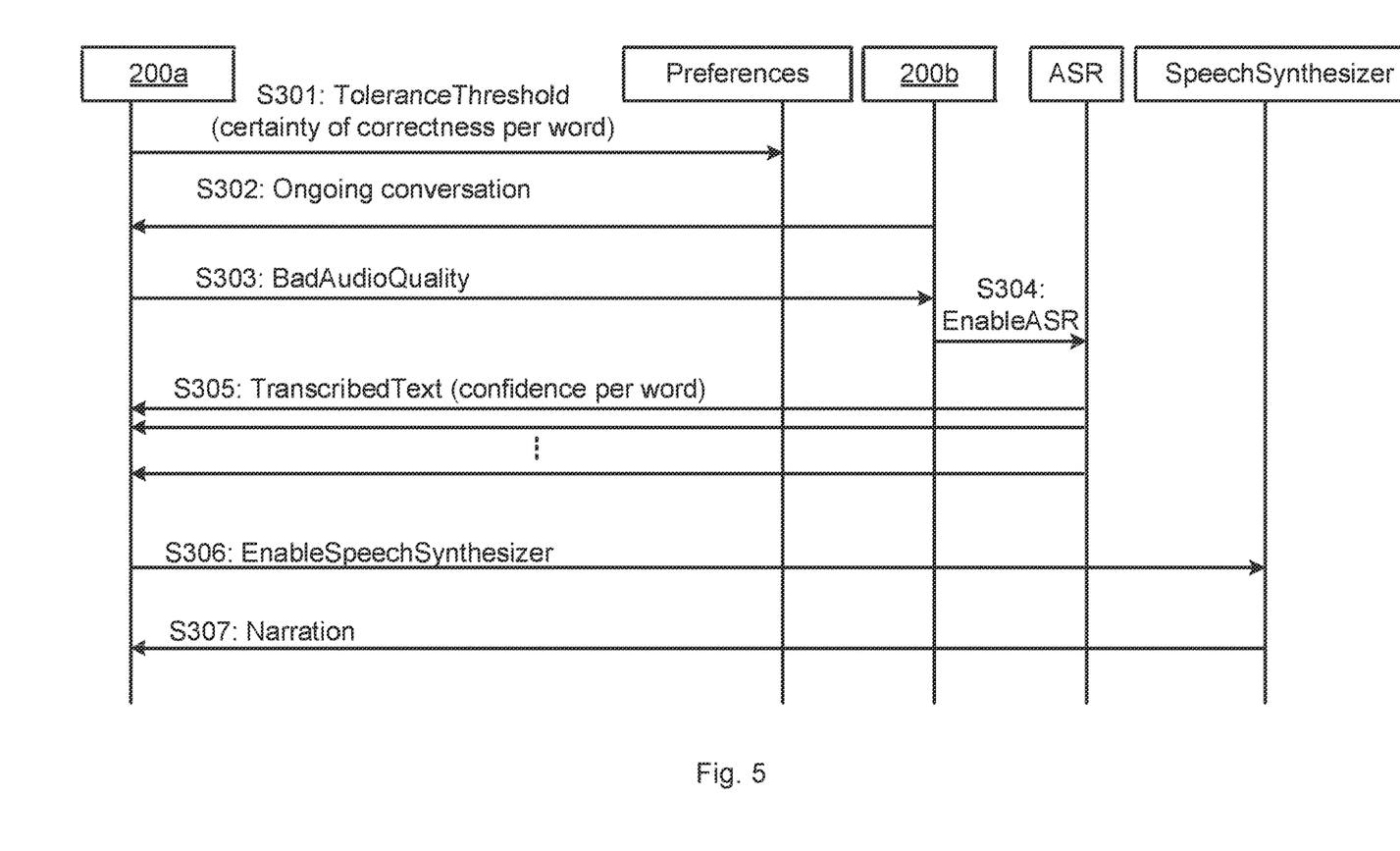
FIG. 5 is a signalling diagram according to an embodiment.

One particular embodiment for handling poor audio quality as performed by terminal device 200a and the network node 300 based on at least some of the above disclosed embodiments will now be disclosed in detail with reference to the signalling diagram of FIG. 5. This particular embodiment does not involve the network node 300 to perform any of the herein disclosed steps, although messages between the terminal devices 200a, 200b and the functions mentioned below could be directed via one or more such network nodes 300.

S301: Terminal device 200a, for example as part of initialization, sends a message ToleranceThreshold (certainty of correctness per word) to a preferences database to indicate what tolerance threshold for the certainty of correctness per word that should be used during the automatic speech recognition such that any words of which the confidence level indication (as defined by the tolerance threshold) is below a threshold value are omitted from being included in future received text. Another piece of information that could be provided to a database is what should happen when the audio quality decrease. A first example is audio/text, where terminal device 200a receives the original audio from terminal device 200b together with text resulting from automatic speech recognition. A second example is text only, where terminal device 200a receives only the text resulting from automatic speech recognition, possibly including the usage of text-to-speech synthesizer that could narrate the text locally to the user.

S302: Terminal device 200a has an ongoing exchange of audio with terminal device 200b, for example as part of an ongoing voice call or video call.

S303: Terminal device 200a obtains an indication of poor audio quality of the incoming audio from terminal device 200b. Terminal device 200a therefore initiates text conversion of the incoming audio by sending a BadAudioQuality message to terminal device 200b. Examples of indication of poor audio quality have been given above. One way to implement step S303 is to perform steps S102 and S104.

S304: Terminal device 200b enables automatic speech recognition to be applied to the audio by sending a message EnableASR to an automatic speech recognition (ASR) function.

S305: Terminal device 200b sends the audio designated for terminal device 200a to the ASR function for text conversion of the audio. The ASR function applies automatic speech recognition to the audio and sends the resulting text to terminal device 200a in TranscribedText messages, where the text optionally is accompanied with information regarding the confidence of the text conversion, such as a confidence value per word. One way to implement step S305 is to perform steps S106 and S112.

S306: Terminal device 200a initiates speech conversion of the received text by sending an EnableSpeechSynthesizer message to a speech synthesizer function. One way to implement step S307 is to perform step S108.

S307: The speech synthesizer function converts the text back to speech by performing speech synthesis of the text. Terminal device 200a obtains audio resulting from the speech synthesis of the text. One way to implement step S307 is to perform steps S110 and S112.

Figure 6:
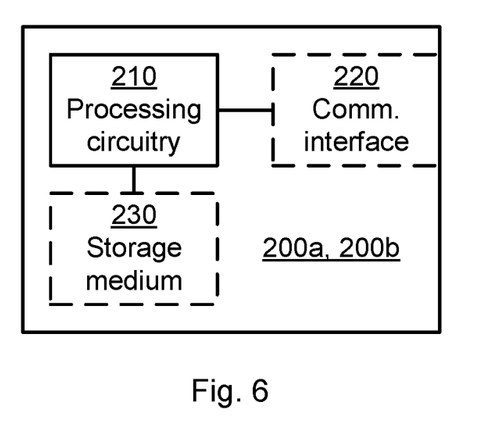
FIG. 6 is a schematic diagram showing functional units of a terminal device according to an embodiment.

FIG. 6 schematically illustrates, in terms of a number of functional units, the components of a terminal device 200a according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200a to perform a set of operations, or steps, S102-S112, as disclosed above. For example, the storage medium 230 may store the set of operations, and the processing circuitry 210 may be configured to retrieve the set of operations from the storage medium 230 to cause the terminal device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200a may further comprise a communications interface 220 for communications with other entities, devices, and nodes of the communications system 100, and particularly the network node 300 and another terminal device 200b. As such the communications interface 220 may comprise one or more transmitters and receivers, comprising analogue and digital components.

The processing circuitry 210 controls the general operation of the terminal device 200a e.g. by sending data and control signals to the communications interface 220 and the storage medium 230, by receiving data and reports from the communications interface 220, and by retrieving data and instructions from the storage medium 230. Other components, as well as the related functionality, of the terminal device 200a are omitted in order not to obscure the concepts presented herein.

Figure 7:
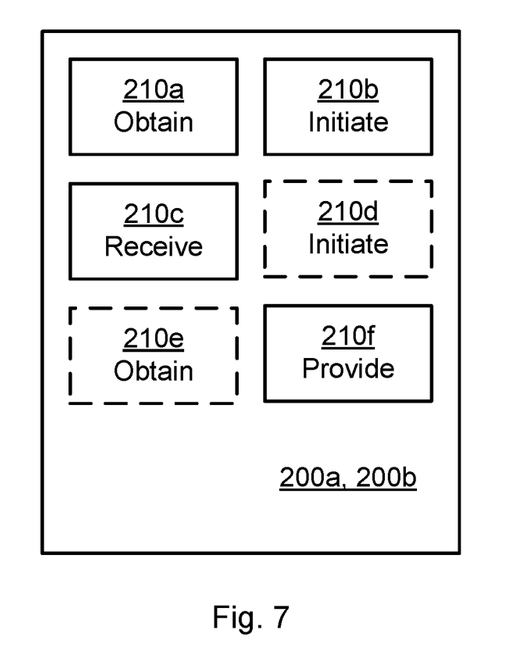
FIG. 7 is a schematic diagram showing functional modules of a terminal device according to an embodiment.

FIG. 7 schematically illustrates, in terms of a number of functional modules, the components of a terminal device 200a according to an embodiment. The terminal device 200a of FIG. 7 comprises a number of functional modules; an obtain module 210a configured to perform step S102, an initiate module 210b configured to perform step S104, a receive module 200c configured to perform step S106, and a provide module 210f configured to perform step S112. The terminal device 200a of FIG. 7 may further comprise a number of optional functional modules, such as any of an initiate module 210d configured to perform step S108 and an obtain module 210e configured to perform step S110. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the terminal device 200a as disclosed herein.

Figure 8:
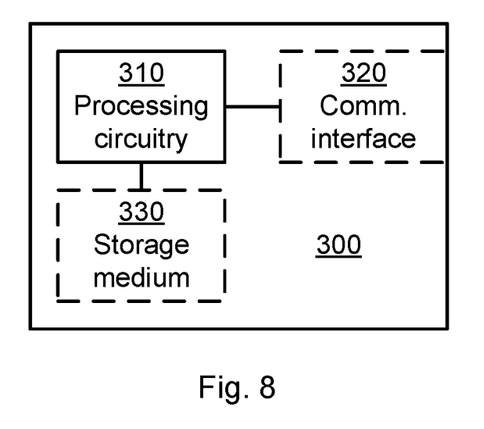
FIG. 8 is a schematic diagram showing functional units of a network node according to an embodiment.

FIG. 8 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S206, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, devices, and nodes of the communications system 100, and particularly the terminal devices 200a, 200b. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 9:
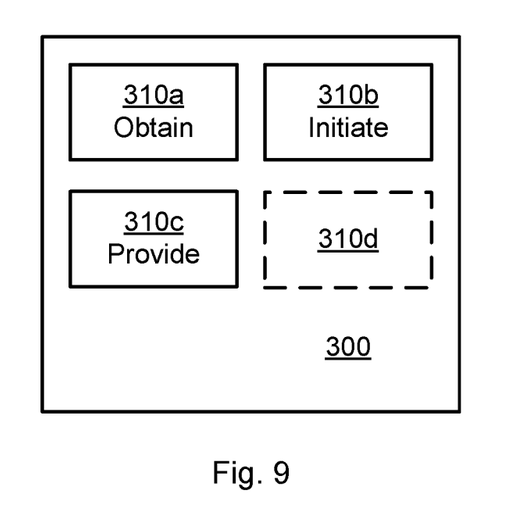
FIG. 9 is a schematic diagram showing functional modules of a network node according to an embodiment.

FIG. 9 schematically illustrates, in terms of a number of functional modules, the components of a network node 300 according to an embodiment. The network node 300 of FIG. 9 comprises a number of functional modules; an obtain module 310a configured to perform step S202, an initiate module 310b configured to perform step S204, and a provide module 310c configured to perform step S206. The network node 300 of FIG. 9 may further comprise a number of optional functional modules, such as represented by functional module 310d. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the terminal devices 200a, 200b than instructions that are not required to be performed in real time. In this respect, at least part of the network node 300 may reside in the radio access network.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 8 the processing circuitry 310 may be distributed among a plurality of devices, or nodes. The same applies to the functional modules 310a-310d of FIG. 9 and the computer program 1020b of FIG. 10 (see below).

Figure 10:
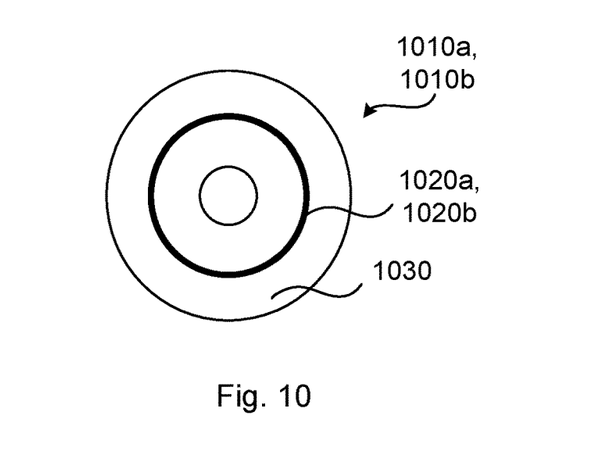
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the terminal device 200a as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the network node 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling poor audio quality, the method being performed by a receiving terminal device, the method comprising:
    obtaining an indication of poor audio quality of incoming audio at the receiving terminal device, the incoming audio originating from a transmitting terminal device, wherein the incoming audio is part of a call or media stream between the receiving terminal device and the transmitting terminal device, wherein the indication of poor audio quality is represented by a network parameter, wherein the network parameter is associated with a threshold level used in order to determine whether the network parameter indicates poor audio quality or not, and wherein the threshold level is set according to which type of call is made or a type of media stream;
    initiating text conversion of the incoming audio, wherein the text conversion is triggered by the indication of poor audio quality;
    receiving text resulting from automatic speech recognition having been applied to the incoming audio; and
    providing a representation of the text to a user interface of the receiving terminal device.

2. The method according to claim 1, wherein the automatic speech recognition of the audio is performed outside the receiving terminal device.

3. The method according to claim 1, wherein the text is received together with a confidence level indication, the confidence level indication representing an estimated accuracy of the automatic speech recognition of the incoming audio.

4. The method according to claim 1, wherein each word in the text has its own confidence level indication, and wherein any words of which the confidence level indication is below a threshold value are omitted from being included in the received text.

5. The method according to claim 1, wherein the indication of poor audio quality is represented by ambient noise picked up by a microphone at the receiving terminal device.

6. The method according to claim 1, wherein the indication of poor audio quality is represented by a failure of an audio component at the receiving terminal device.

7. The method according to claim 1, wherein the indication of poor audio quality is obtained from user input at the receiving terminal device.

8. The method according to claim 1, wherein the user interface is a visual user interface and wherein the representation of the text is the text itself.

9. The method according to claim 8, wherein the text is provided to the visual user interface synchronized with the incoming audio being provided to an audio user interface of the receiving terminal device.

10. The method according to claim 1, further comprising:
    initiating speech conversion of the received text; and
    obtaining audio resulting from speech synthesis of the text;
    wherein the representation of the text is defined by the audio resulting from the speech synthesis, and wherein the user interface is an audio user interface.

11. The method according to claim 1, wherein initiating text conversion involves renegotiating a Session Initiation Protocol, SIP, session with session description protocol, SDP, payload represented by the text.

12. A method for handling poor audio quality, the method being performed by a network node, the method comprising:
    obtaining an indication of poor audio quality of incoming audio to be delivered to a receiving terminal device, the incoming audio originating from a transmitting terminal device, wherein the incoming audio to be delivered is part of a call or media stream between the receiving terminal device and the transmitting terminal device, wherein the indication of poor audio quality is represented by a network parameter, wherein the network parameter is associated with a threshold level used in order to determine whether the network parameter indicates poor audio quality or not, and wherein the threshold level is set according to which type of call is made or a type of media stream;
    initiating text conversion of the incoming audio, wherein the text conversion is triggered by the indication of poor audio quality; and
    providing text resulting from automatic speech recognition having been applied to the incoming audio to the receiving terminal device.

13. The method according to claim 12, wherein the automatic speech recognition of the audio is performed by the network node.

14. The method according to claim 12, wherein the automatic speech recognition of the audio is performed outside the network node.

15. A receiving terminal device for handling poor audio quality, the receiving terminal device comprising:
    processing circuitry and a storage medium storing instructions that when executed by the processing circuitry cause the receiving terminal device to
        obtain an indication of poor audio quality of incoming audio at the receiving terminal device, the incoming audio originating from a transmitting terminal device, wherein the incoming audio is part of a call or media stream between the receiving terminal device and the transmitting terminal device, wherein the indication of poor audio quality is represented by a network parameter, wherein the network parameter is associated with a threshold level used in order to determine whether the network parameter indicates poor audio quality or not, and wherein the threshold level is set according to which type of call is made or a type of media stream, initiate text conversion of the incoming audio, wherein the text conversion is triggered by the indication of poor audio quality, receive text resulting from automatic speech recognition having been applied to the incoming audio, and provide a representation of the text to a user interface of the receiving terminal device.

16. A network node for handling poor audio quality, the network node comprising:

processing circuitry and a storage medium storing instructions that when executed by the processing circuitry cause the network node to obtain an indication of poor audio quality of incoming audio to be delivered to a receiving terminal device, the incoming audio originating from a transmitting terminal device, wherein the incoming audio to be delivered is part of a call or media stream between the receiving terminal device and the transmitting terminal device, wherein the indication of poor audio quality is represented by a network parameter, wherein the network parameter is associated with a threshold level used in order to determine whether the network parameter indicates poor audio quality or not, and wherein the threshold level is set according to which type of call is made or a type of media stream, initiate text conversion of the incoming audio, wherein the text conversion is triggered by the indication of poor audio quality, and provide text resulting from automatic speech recognition having been applied to the incoming audio to the receiving terminal device.

17. The method according to claim 3, wherein the confidence level indication is represented via a color code and/or a font.

18. The method according to claim 12, wherein the text is generated together with a confidence level indication, the confidence level indication represents an estimated accuracy of the automatic speech recognition of the incoming audio, and the confidence level indication is represented via a color code and/or a font.

19. The receiving terminal device according to claim 15, wherein the text is generated together with a confidence level indication, the confidence level indication represents an estimated accuracy of the automatic speech recognition of the incoming audio, and the confidence level indication is represented via a color code and/or a font.

20. The network node according to claim 16, wherein the text is generated together with a confidence level indication, the confidence level indication represents an estimated accuracy of the automatic speech recognition of the incoming audio, and the confidence level indication is represented via a color code and/or a font.

* * * * *